United States Patent [19]

Shaltiel et al.

[11] 3,770,584

[45] Nov. 6, 1973

[54] PRONASE PURIFICATION
[75] Inventors: Shmuel Shaltiel; Michael Sela, both of Rehovoth, Israel
[73] Assignee: Beecham Group Limited, Brentford, Middlesex, England
[22] Filed: May 10, 1972
[21] Appl. No.: 252,051

Related U.S. Application Data
[63] Continuation of Ser. No. 802,688, Feb. 26, 1969, abandoned.

[30] Foreign Application Priority Data
Feb. 29, 1968 Great Britain...................... 9,778/68

[52] U.S. Cl. ............. 195/2, 195/36 P, 195/DIG. 11
[51] Int. Cl. .............................................. C12d 9/12
[58] Field of Search ............. 195/63, 36 P, DIG. 11, 195/2, 63

[56] References Cited
UNITED STATES PATENTS
3,556,945  1/1971  Messing ................................ 195/63
3,446,705  5/1969  Heuser et al. ...................... 195/36 P OTHER PUBLICATIONS
Knudsen, The Lancet, June 1967, pages 1184–1188.
Silman et al., Annual Review of Biochemistry 1966, Vol. 35 part II, pages 891–895.
Weliky et al., Immunochemistry, Dec. 1965, pages 319–320.
Kay, Process Biochemistry, Aug. 1968 pages 36–39.

Primary Examiner—Lionel M. Shapiro
Attorney—Jacobs & Jacobs

[57] ABSTRACT

The antigenic materials in 6-aminopenicillanic acid and penicillins and derivatives thereof obtained by fermentation are degraded by bringing an aqueous solution of the 6-aminopenicillanic acid or penicillin or derivatives thereof into contact with water-insoluble derivative of a proteolytic enzyme. The proteolytic enzyme is preferably pronase and the water-insoluble derivative is obtained from the enzyme and bromoacetyl-cellulose or from the enzyme and sephadex or carboxymethyl-cellulose. The resulting product is unlikely to cause anaphylactic shock.

3 Claims, No Drawings

PRONASE PURIFICATION

This is a continuation, Ser. No. 802,688 filed Feb. 26, 1969, now abandoned.

The present invention relates to a method of reducing the antigencity associated with 6-aminopenicillanic acid and penicillins and derivatives thereof obtained by fermentation processes.

6-Aminopenicillanic acid and penicillins and derivatives thereof obtained be fermentation processes as hereinafter defined, and as isolated by conventional methods contain strongly antigenic impurities. These impurities cause known disadvantages when the penicillins (which may have been prepared from the 6-aminopenicillanic acid) are used as therapeutic agents, for example they may produce anaphylactic shock in patients. It is therefore an object of the present invention to provide a process for degrading these antigenic impurities so that the immunogenicity of the product and its reactivity with specific antibodies are very much reduced.

Accordingly the present invention provides a process for degrading the antigenic materials in 6-aminopenicillanic acid and penicillins and derivatives thereof obtained by a fermentation method as hereinafter defined, which process comprises contacting an aqueous solution containing said 6-aminopenicillanic acid or penicillin or derivative thereof with at least one water-insoluble derivative of at least one proteolytic enzyme.

It is to be understood that the degradation process may be applied to (1) penicillins produced by direct fermentation in presence of a side-chain precursor, (2) 6-aminopenicillanic acid prepared by direct fermentation in a synthetic nutrient medium, (3) 6-aminopenicillanic acid prepared by enzymatic hydrolysis of a penicillin, (4) 6-aminopenicillanic acid or an ester thereof prepared by chemical removal of the side chain from a penicillin, or (5) penicillins or derivatives thereof prepared from 6-aminopenicillanic acid not previously treated by the degradation process; the penicillins could be prepared by straight-forward acylation of the 6-aminopenicillanic acid and purified directly or converted to closely related derivatives, for example the reaction product of $\alpha$-aminobenzylpenicillin with acetone, which derivative is subjected to the degradation process.

The water-insoluble enzyme derivatives are prepared by known methods, for example by the methods described in British Patent Specifications Nos. 916,931 and 1,062,596. Preferably the proteolytic enzyme used is pronase, which is isolated from Streptomyces griseus and has a broad specificity. The enzyme may be reacted for example with bromoacetylcellulose or coupled with CM-Sephadex ("Sephadex" is a registered trade mark) in presence of a suitable amide-forming reagent, such as a carbodiimide. The water-insoluble derivatives retain the activity of the parent enzyme, but in use remain in the water-insoluble form, and so may be used in continuous processes in columns and other equipment. More than one enzyme may be present in the water-soluble form to increase the range of activity, with consequent greater degradation of the proteinaceous antigens in the starting material.

With water-insoluble pronase, the process is preferably effected at pH 7-8 for optimum results, and the digestion of proteinaceous materials occurs rapidly, probably in 1 to 3 hours.

The efficacy of pronase to degrade the proteinaceous antigenic impurities found in 6-aminopenicillanic acid was shown by tests made with an isolated antigenic fraction, that was treated with pronase. The tests involved electrophoresis and chromatography of the treated fraction and showed that it behaved like an amino acid mixture. The treated fraction on dialysis left only a retentate of pronase, whereas the initial fraction was not dialysable in a control test. By the PCA test it was established that no antibodies had been produced in animals injected with the treated fraction. The efficacy of the pronase was not affected when the antigenic fraction was mixed with a large excess of 6-aminopenicillanic acid, i.e., to correspond with the situation in commercial 6-aminopenicillanic acid.

Similar results on the efficacy of water-insoluble derivatives of pronase were found in tests with batches of 6-aminopenicillanic acid and such penicillins as benzylpenicillin and $\alpha$-aminobenzylpenicillin.

The following Examples illustrate the invention:

EXAMPLE 1

The antigenic impurity fractions previously isolated from commercial 6-aminopenicillanic acid by using a molecular sieve were tested as follows:

One 1.5 mg. of the fraction was dissolved in 5.7-N hydrochloric acid and hydrolysed at $105° + 1°C$ for 16 hours. The product was examined with an amino acid analyser.

Another 1.5 mg. of the fraction was dissolved in 0.5 ml. of 0.05 M ammonium bicarbonate buffer at pH 7.9 and $10\gamma$ of a solution of 1.5 mg. pronase/ml. in same buffer was added and the mixture was incubated at 37°C for 16 hours, then evaporated to dryness and the product was also examined with an amino acid analyser.

For both products the presence of a large number of amino acids was determined and some small peptides, probably dipeptides, appeared to be formed. The experiments showed that the pronase lacked specificity and degraded the proteinaceous material to amino acids and small peptides in the same way as the acid treatment.

EXAMPLE 2

2 mg. of the antigenic impurity fraction (previously isolated from commercial 6-aminopenicillanic acid by using a molecular sieve) in 1 ml. of 0.05 M ammonium bicarbonate buffer at pH 8.3 was mixed with 0.02 mg. commercially available water-soluble pronase and was incubated at 37°C for 22 hours.

The digest had a considerably reduced ability to provoke the formation of antibodies as indicated by PCA tests in the guinea pig. In control tests (1) the untreated antigenic impurity fraction in the buffer and freshly prepared before injection and (2) 2 mg. of the antigenic impurity fraction treated in the same way as described above but without addition of pronase, were used.

The results are shown in the following Table I.

TABLE I

| Time (days) | Group | No. of positive animals per total No. of animals tested. | Diameter of spot (mm.) |
| --- | --- | --- | --- |

| | | | |
|---|---|---|---|
| 10 | A | 0/4 | 0 |
| | B | 0/4 | 0 |
| | C | 0/10 | 0 |
| 18 | A | 2/4 | 10 |
| | B | 1/3 | 10 |
| | C | 0/9 | 0 |
| 24 | A | 3/4 | 25 |
| | B | 2/3 | 25 |
| | C | 0/9 | 0 |
| 54 | A | 3/3 | 30 |
| | B | 3/3 | 30 |
| | C | 1/8 | 23 |
| 90 | A | 3/3 | 26 |
| | B | 3/3 | 28 |
| | C | 2/7 | 18 |
| 134 | A | 3/3 | 27 |
| | B | 3/3 | 28 |
| | C | 2/7 | 20 |

A=untreated antigenic impurity fraction
B=fraction incubated without pronase
C=fraction incubated with pronase The experiment involved three groups of guinea pigs, groups A and B each involving four guinea pigs and group C involving 10 guinea pigs.

Animals from group A were immunised with 0.25 ml. of the incubated mixture from the antigenic impurity fraction and pronase, mixed with 0.25 ml. of Freund's complete adjuvant. Animals from groups B and C were immunised similarly with solutions prepared for the control tests as described above.

Bleedings were carried out at the indicated intervals and the sera obtained were frozen until usage. Passive cutaneous anaphylaxis (PCA) tests were carried out on albino guinea pigs (weighing 250–300g.) Amounts of 0.1 ml. antiserum were injected intradermally and 18 hours later the animals were challenged with 1 ml. of a freshly prepared solution of the untreated antigenic impurity fraction (1 mg./ml. in saline), mixed with 1 ml. of a 1 percent solution of Evans' Blue. The diameters of the spots were recorded after 10 minutes.

EXAMPLE 3

The effect of pronase on the antigenicity of an antigenic impurity fraction (previously isolated from commercial 6-aminopenicillanic acid by using a molecular sieve material) was determined in skin tests, and the results are shown in Table II.

| Amount of antigen injected ($\gamma$) | Average diameter of reaction spot (mm) (after 24 hrs.) | |
|---|---|---|
| | Untreated impurity fraction | Pronase-treated impurity fraction |
| 50 | 20 | 9 |
| 10 | 17 | 3 |
| 5 | 15 | 2 |
| 2.5 | 11 | 0 |
| 1 | 10 | 0 |
| 0.5 | 5 | 0 |
| 0.05 | 0 | 0 |

Eight guinea pigs were immunised with the untreated impurity fraction as described in Example 2. After 20 days they reached a uniform antibody level in the serum determined by PCA tests. At that time each animal was skin tested with 0.05–50$\gamma$ of the impurity fraction in 0.1 ml. saline or an equivalent amount of the fraction previously digested with pronase (dissolved in 0.05 M-ammonium bicarbonate, treated with pronase and incubated for 22 hours at 37°C, as described in Example 2). Reaction spots were measured 24 hours after challenge.

EXAMPLE 4

Similar experiments to those described in Example 2 were made with mixtures of (A) 6-aminopenicillanic acid and 1 percent of the antigenic impurity fraction and (B) 6-aminopenicillanic acid, 1 percent antigenic impurity fraction and pronase (2 percent based on the protein content of the impurity fraction), and the results are shown in Table III.

TABLE III

| Time (days) | Group | No. of positive animals per total No. of animals treated | Diameter of spot (mm.) |
|---|---|---|---|
| 10 | A | 0/4 | 0 |
| | B | 0/4 | 0 |
| 18 | A | 2/4 | 10 |
| | B | 0/4 | 0 |
| 24 | A | 3/4 | 23 |
| | B | 0/4 | 0 |
| 38 | A | 4/4 | 23 |
| | B | 1/4 | 20 |
| 85 | A | 4/4 | 22 |
| | B | 1/4 | 18 |
| 130 | A | 4/4 | 26 |
| | B | 1/4 | 20 |

Immunogenicity was assessed by PCA tests as described in Example 2.

EXAMPLE 5

The effect of pronase on the titration of antisera against an antigenic impurity fraction from commercial 6-aminopenicillanic acid was determined and the results are shown in Table IV.

TABLE IV

| Dilution of serum | Average diameter of spot (mm) | |
|---|---|---|
| | Untreated | Pronase treated |
| 1:5 | 26 | 21 |
| 1:10 | 25 | 17 |
| 1:20 | 21 | 14 |
| 1:50 | 19 | 12 |
| 1:100 | 17 | 10 end point |
| 1:250 | 12 | 0 |
| 1:500 | 10 | 0 |
| 1:1000 | 7 end point | 0 |
| 1:2000 | 4 | 0 |
| Control:Normal Guinea Pig serum diluted 1:5 | 0 | 0 |

A pool of positive antisera against the impurity fraction was diluted with saline as shown in the Table. A volume of 0.1 ml. of the diluted solution was injected intradermally to two groups each of four guinea pigs. One of the groups was challenged after 18 hours with 1 ml. of solution containing 0.1 mg. of the impurity fraction and 1 ml. Evans' blue in saline. The other group was challenged with an equivalent amount of impurity fraction treated with water-insoluble pronase (obtained by reaction of pronase with bromoacetylcellulose).

EXAMPLE 6

Samples of commercial benzylpenicillin and ampicillin were tested for reduction of immunogenicity after treatment with water-insoluble pronase (from bromoacetylcellulose and pronase), and the results are shown in Table V.

TABLE V

| Compound | Time (days) | Group | No. of positive animals per total number of surviving rabbits immunized | Average diameter of spot (mm) |
|---|---|---|---|---|
| Penicillin G | 14 | A | 2/5 | 20 |
|  |  | C | 0/5 | 0 |
| Do. | 21 | A | 5/5 | 24 |
|  |  | C | 1/5 | 25 |
| Do. | 28 | A | 4/5 | 26 |
|  |  | C | 1/5 | 23 |
| Ampicillin | 14 | A | 2/2 | 33 |
|  |  | C | 0/3 | 0 |
| Do. | 21 | A | 2/2 | 29 |
|  |  | C | 0/3 | 0 |
| Do. | 28 | A | 2/2 | 30 |
|  |  | C | 0/3 | 0 |

Groups of 5 rabbits were immunized with 50 mg. of the test penicillin. Groups A received untreated samples of the penicillins while groups C received the penicillins after prior incubation with an equal weight of insoluble pronase (at 37°C for 22 hours in buffer at pH 8.3). Injections were given subcutaneously in complete Freund's adjuvant (1:1). Booster injections of 50 mg. antigen in complete Freund's adjuvant were given on the 8th and 15th day. The rabbits were bled on days 1, 7, 14, 21 and 28 and the sera were stored at −20°C. PCA tests were carried out on the antisera using penicilloyl BGG as antigen.

EXAMPLE 7

300 mg. pronase in citrate phosphate buffer at pH 5.1 was added to 10 g. bromoacetyl-cellulose (wet weight). The suspension was stirred gently for 30 hours at room temperature (22°C) and drop of antifoam agent was added. The suspension was then centrifuged at 10,000 G for 10 minutes and the precipitate was resuspended in 30 ml. 0.1 M bicarbonate buffer at pH 8.9. The suspension was left at 4°C for 24 hours and then centrifuged at 10,000 G for 10 minutes. The supernatants were kept for measurement of optical density. The precipitate was resuspended in 0.05 M 2-aminoethanol in 0.1 M bicarbonate buffer at pH 8.9. The preparation was finally centrifuged again and washed in 0.15 M sodium chloride until the supernatant had no optical density at 280 m$\mu$.

The catalytic activity of the bound pronase was determined by using as substrate tyrosyltyrosine, tryptophyltyrosine or leucyl glycine. The activity against these substrates was determined chromatographically as a function of time, with soluble pronase as control.

EXAMPLE 8

1.5 mg. of an impurity fraction from a sample of commercial 6-aminopenicillanic acid was dissolved in 0.5 ml. 0.05 M ammonium bicarbonate buffer at pH 7.9 and added to 10 $\gamma$ (0.01 ml.) of a solution containing 1.5 mg. pronase/ml. (as water-insoluble material) in the same buffer. The mixture was incubated at 37°C for 16 hours with gentle mixing and then evaporated to dryness.

In such a test it was found that the water-insoluble pronase material could be used repeatedly without appararent loss of activity. For example, material obtained from bromoacetylcellulose was used five times during 10 months. Each time after use the material was washed in buffer then in saline and stored at 4°C in presence of calciumions to stabilise the enzyme.

In such tests the water-insoluble materials obtained from pronase and carboxymethylcellulose and carboxymethyl-sephadex were less effective than the material obtained from bromoacetylcellulose.

EXAMPLE 9

A 2g. sample of commercial 6-aminopenicillanic acid was dissolved in water with addition of 3N-sodium hydroxide to pH 8.6, then diluted to 20 ml. The solution was divided into two equal parts, both of which were incubated at 37°C for 20 hours, except that one part contained 500 mg. of water-insoluble pronase material (from pronase and bromoacetylcellulose). The solution containing the pronase was centrifuged, and the two solutions were adjusted to pH 4.3 with 3N-hydrochloric acid and kept at 0°C for 24 hours. Solid 6-aminopenicillanic acid was recovered from each solution and used to immunise rabbits according to the following schedule and the antibody response was measured:

Day 1 — 50 mg. of the 6-aminopenicillanic acid in Freund's complete adjuvant (2 mg./ml. M. butyricum) + 6 mg. of the 6-aminopenicillanic acid in aq. solution (at 6 × 0.1 ml. of a 10 mg./ml. solution), all subcutaneously.

Day 7 — 40 mg. of the 6-aminopenicillanic acid subcutaneously in Freund's complete adjuvant.

The results are shown in Table VI.

TABLE VI

| Material | Rabbit | Haemagglutination titre. Reciprocal against benzylpenicilloylated rabbit erythrocytes Day | | | | |
|---|---|---|---|---|---|---|
|  |  | 0 | 7 | 14 | 21 | 28 |
| Control 6-aminopenicillanic acid | 1 | 0 | 2048 | 16400 | 512 | 128 |
|  | 2 | 0 | 256 | 512 | 200 | 256 |
|  | 3 | 0 | 64 | 1024 | 100 | 128 |
| Pronase-treated 6-aminopenicillanic acid | 4 | 0 | 6 | 128 | 32 | 64 |
|  | 5 | 0 | 4 | 4 | 8 | 8 |
|  | 6 | 0 | 0 | 0 | 4 | 128 |

The results showed that there was a significant reduction in immunogenicity of the commercial 6-aminopenicillanic acid (which was a highly immunogenic batch) after the treatment with insoluble pronase.

We claim:

1. A process for reducing the antigenicity of the antigenic materials in 6-aminopenicillanic acid and penicillins and derivatives thereof obtained by a fermentation method prior to administration thereof, which process comprises chemically degrading the antigens but not the 6-amino-penicillanic acid and penicillins and derivatives thereof by contacting an aqueous solution containing said 6-aminopenicillanic acid or penicillin or derivative thereof with at least one water-insoluble derivative of pronase which retains the activity of the pronase and is obtained by coupling the pronase and CM-sephadex or carboxymethylcellulose.

2. A process as claimed in claim 1, wherein the degradation is effected at pH 7–8.

3. The process according to claim 1, wherein the water-insoluble derivative is obtained by reacting the pronase and bromoacetylcellulose.

* * * * *